INVENTOR.
WALLACE J. MURRAY
BY
ATTORNEY

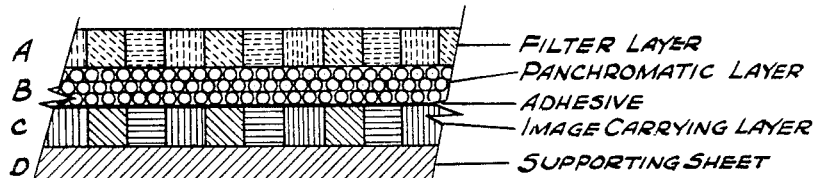
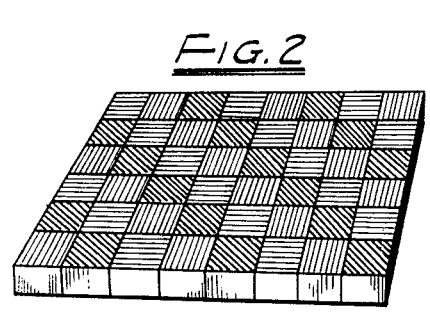
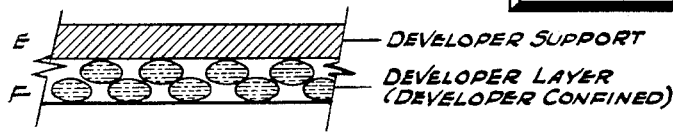
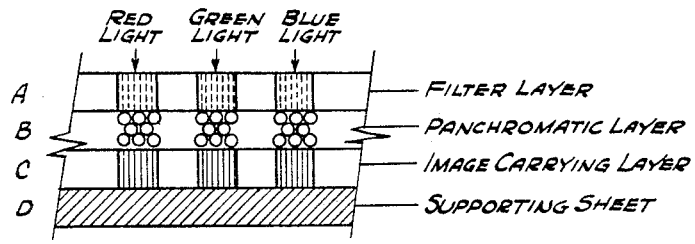
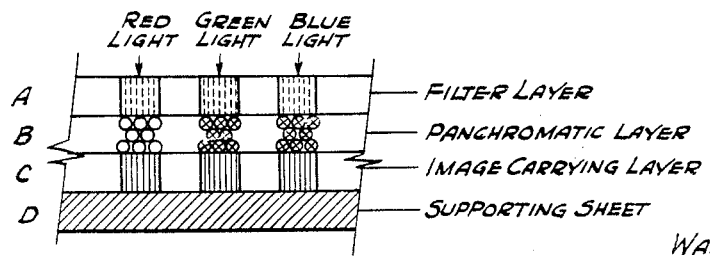

Jan. 12, 1965     W. J. MURRAY     3,165,406
MULTICOLOR PHOTOGRAPHIC PROCESS AND PRODUCT

Filed Oct. 24, 1958     3 Sheets-Sheet 3

INVENTOR.
WALLACE J. MURRAY
BY
ATTORNEY

United States Patent Office 3,165,406
Patented Jan. 12, 1965

3,165,406
MULTICOLOR PHOTOGRAPHIC PROCESS
AND PRODUCT
Wallace J. Murray, Cambridge, Mass., assignor to Arthur
D. Little, Inc., Cambridge, Mass., a corporation of
Massachusetts
Filed Oct. 24, 1958, Ser. No. 769,490
19 Claims. (Cl. 96—3)

This invention relates to photography and more particularly to a photographic process which permits the production of true color prints, or positive transparencies, in a short space of time within or outside the camera.

The production of a black and white print, or a print in shades of one color, shortly after exposure, within the body of a camera without any subsequent darkroom processing is known. (See for example U.S. Patents 2,543,181 and 2,661,293.) However, the production of good true color prints within a small confined space such as the body of a camera without further darkroom operations, has not, to my knowledge, been achieved. Neither am I aware of a single process by which the mere choice of film type permits making color prints or positive transparencies.

By present available techniques, color prints are now made from a positive color transparency either by using separation negatives and super-imposing the dye images so obtained, or by exposing a multiple-layered coupler containing light-sensitive elements or sheet on an opaque support to light passing through the transparency onto the light-sensitive element. Both of the methods for obtaining color prints are laborious and expensive.

Difficulties introduced by varying color densities across the original transparency and also in regulating the composition (i.e., the proportions of the various wavelengths present) of the light with respect to the spectral response of the second light-sensitive emulsion contribute to a marked loss in color quality in the final print. An alternate method of making prints from a positive transparency is to make a color negative (having complementary colors) and then to make a print from it as is done when a color negative is the result of the original exposure. The various steps of these methods for producing color prints require darkroom processing including developing, fogging, stopping, washing, fixing, masking, etc.

In the process disclosed by Land (U.S. Patent 2,543,-181) the final black and white print is produced by the selective transfer of certain products resulting in the reaction between a developer and the constituents of a photosensitive layer. In such processes, registry of the image must be accomplished in the process of printing, i.e., the process of selective transference. Since such selective transference is sometimes difficult to control and hence good registry is difficult to achieve, it would be desirable to have available a process wherein selective transference is eliminated and registry is accomplished during the manufacture of the film.

It is therefore an object of this invention to provide an improved photographic process wherein a visible positive true image is obtained by transfer directly on a sheet without the necessity of carrying out any intermediate steps. The image thus obtained approximates true colors. The supporting sheet may be opaque or transparent resulting in a final print or positive transparency, respectively.

It is another object to provide an improved photographic process wherein the positive color image is obtained shortly after the original exposure is made.

It is a further object of this invention to provide an improved photographic process which permits making the color prints or transparencies within a small confined space, such as the body of a camera, without any subsequent darkroom processing. It is still a further object of this invention to provide a process for making color prints which have not lost any of their color quality.

It is an additional object to provide a process for producing directly an approximately true color print or positive transparency without the necessity of selectively transferring certain dyes to a receptor element. It is still another object of this invention to furnish a photographic film capable of producing color prints or positive transparencies in which all the registry has been accomplished at the time of film manufacture. These and other objects will be apparent in the following discussion of this invention and with reference to the accompanying drawings in which:

FIG. 1 is a diagrammatic cross-sectional view of a film constructed according to this invention;

FIG. 2 illustrates a possible pattern for printing the dye-formers on a film of this invention;

FIG. 3 is a diagrammatic cross-sectional view of a device for applying the necessary quantity of developer;

FIGS. 4 through 6 are simplified diagrammatic representations of the various steps of the process of this invention to produce a positive color print or transparency, including the steps of exposure to light (FIG. 4), the filtering of the light and production of latent images (FIG. 5) and the developing of a reflective print (FIG. 6);

Figure 6:
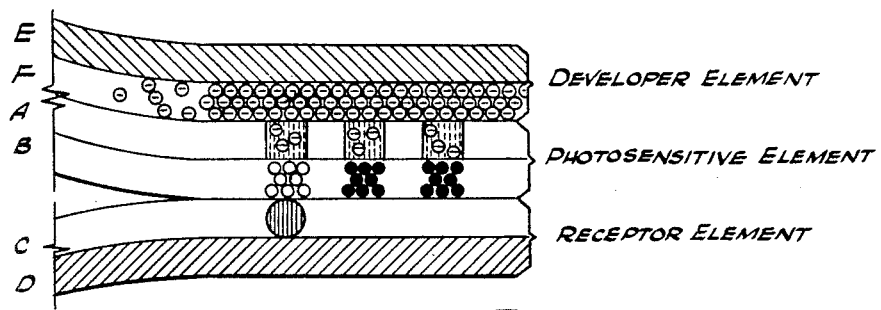

The film of this invention comprises a water permeable panchromatic layer covered, on that surface which is exposed to the image to be photographed, with transparent color dots systematically arranged and capable of alternately filtering out red, green, and blue light. That is, the filtering dots are the subtractive primary colors, cyan, magenta and yellow. Directly under these filtering dots are printed or deposited dots of couplers capable of producing dyes of the additive primary colors corresponding to the filtering dots. This means that under a cyan filter dot is deposited a coupler dot capable of producing red dye, under the magenta filter dot a green-producing coupler dot, and under the yellow filter dot a blue-producing coupler dot. The two sets of primaries may also be reversed; namely by using red, green and blue filter dots and cyan, magenta and yellow coupler dots. In this case the filter dots will be complimentary to the coupler dots; a red filter dot will have a cyan coupler dot under it, a green filter dot will have a magenta coupler dot under it and a blue filter dot will have a yellow coupler dot under it. When exposed to an image reflecting light of various colors, the individual filter dots will each prevent certain wavelengths of light from striking the panchromatic film. That portion of light permitted to pass will sensitize, i.e., will produce a latent image in that part of the panchromatic film lying directly under the filtering dots through which it passed, while that part of the panchromatic film lying directly under the filter dots which have blocked the passage of light will remain unsensitized, i.e., will remain unchanged. Subsequent application of a limited quantity of a developer, which permeates the filter dot layer, the panchromatic layer and the layer carrying the couplers causes a dye to be formed directly under the filter dots which have excluded light from entering the panchromatic film. The film layers are then separated leaving a supporting sheet holding the dye particles as a print or transparency and leaving the remaining portion of the film as a potential negative.

The process of this invention may be further explained with reference to FIGS. 1–6 (FIGS. 1 through 6 are all diagrammatic representations and are not meant to indicate relative sizes or thicknesses of the component parts involved.)

In FIG. 1, the film, made up in accordance with this invention in four layers, is shown in cross-section. Layer B is a gelatin panchromatic film made up by any process known in the art. Since it must be permeable to the developer, it must not have any celluloid or other impermeable backings. On the surface which is exposed to the light reflected by the image to be photographed is placed a layer A of a gelatin or other suitably transparent and permeable base on which are printed alternating cyan, magenta and yellow filter dots as illustrated. On the other surface of panchromatic layer B is placed layer C which becomes the image-carrying layer of the final print or transparency and which consists of a thin gelatin or other suitable layer on which have been deposited the coupler dots, complementary in color to the filter dots directly above them. Thus the coupler dot directly below a cyan filter dot is capable of producing a red dye. Similarly, a green-producing coupler dot is under a magenta filter dot and a blue-producing coupler dot is under a yellow filter dot. Layer D is a suitable supporting sheet which will form the support for the final image-carrying layer, C. Panchromatic layer B is so joined to image-carrying layer C that contact between them is effectively maintained while these layers are in a dry condition but is broken when the developer permeates certain areas of the panchromatic layer B and wets the contacting surfaces of layers B and C.

FIG. 2 illustrates how the three types of coupler dots, i.e., those producing red, green and blue dyes, may be arranged in layer C. The filter dots corresponding to the complementary colors would be similarly arranged in filter layer A.

Assume (FIG. 4) the very simple situation of three cyan filter dots, under each of which is deposited a dot of coupler capable of producing a red dye dot when reacted with a suitable developer. Assume further that red light strikes one, green another and blue the third filter dot. Inasmuch as these are cyan filters the red light will be absorbed and none of it will reach the light sensitive silver halide grains of the panchromatic layer B lying directly under that cyan filter dot. On the other hand, green light and blue light will be passed by the remaining two cyan filters and hence the silver halide grains of the panchromatic layer B lying under these last two filter dots will be sensitized and latent images will be formed. This step is diagrammatically portrayed in FIG. 5.

After exposure (FIG. 4) and the formation of latent images (FIG. 5), it is necessary to apply a limited, predetermined quantity of developer. One way in which this developer may be applied is by pressing against the free or upper surface of filter layer A a porous-type material capable of discharging or exuding developer evenly over the free surface of filter layer A. One example of such a porous-type material is illustrated in FIG. 3. In this arrangement, developer contained in discrete, but frangible, pods or capsules is held by a porous matrix in layer form, the developer layer F being attached to an impermeable support E hereinafter called the developer support. The developer layer matrix may be any material which permits the developer, once freed from the pods or capsules, to pass freely through it to the filter layer A. Such matrix material would include among other things sponge rubber, porous cellulosic materials, etc. Other methods of applying developer, such as using sponge rubber or blotter paper without pods or capsules, spraying on a thin coating of developer, etc., will be apparent to those skilled in the art.

As the developer is applied by a suitable means, it will permeate the filter dots and strike the panchromatic layer B (FIG. 6). Those areas within the panchromatic layer which were not sensitized (i.e., those areas lying directly under the filter dots which have absorbed light) will permit the developer to pass through the image-carrying layer to react with the couplers contained therein to form a dye. Those areas within the panchromatic layer which were sensitized by the light passing through the filter dyes above them will prevent the developer from permeating further, thus preventing any further coupler-developer reaction to take place. Turning now again to the specific example of cyan filters (FIG. 6), the developer penetrates through the filter dots and in the case of the cyan dot which absorbed the red light, the developer continues to penetrate through the panchromatic layer B to strike the image-carrying layer C where it reacts with the red-forming coupler dot to form a red dye dot in the image-carrying layer. Where green and blue light strike filter layer A, pass through the cyan filter dots, and sensitize (produce a latent image in) the panchromatic film under them, the developer reacts with the sensitized panchromatic film and itself becomes oxidized.

The oxidized developer does not pass through the gelatin film because it is able to combine with, or to tan, the gelatin. Tanning development, based on the reaction between oxidized developer and gelatin is well known and is not part of the present invention. The presence of an insoluble coupler in the panchromatic film also would hold back the oxidized developer. However, the use of such a coupler should not be necessary.

In a similar manner magenta filter dots will pass red and blue light and form green dye dots under them, while yellow filter dots will pass red and green light and form blue dye dots under them.

After the formation of the dyes in the image-carrying layer the receptor element is removed from the photosensitive element to give a true color print or transparency.

When white light strikes the filter dots it will pass through all of them since it contains red, green, and blue light. In this case there will be latent images under all dots and therefore there will be no colored dots in the image layer and hence the image layer will be transparent and will show the color of the backing, usually white, in print. Where no light strikes, all colored dots will develop, and a neutral gray will be produced as noted below.

In the case of an image formed of colored and white (or transparent) dots there is additive-color mixing due to the blending of the images in the eye. In this case, when red light strikes the film there results red and white dots, one red dot under the cyan filter and two white dots under both the magenta and yellow filters. The result will be a mixture of red and white light but will appear red due to the excess of red light. Similarly, green and blue dots will be mixed with white dots. There will then be white mixed with all colors and only the white itself will be pure. In the case of black (i.e., where no light strikes the film) the red, green and blue dots will each absorb two-thirds of the light incident on them, and will reflect or transmit one-third of the light, giving a gray instead of a true black. True black cannot be obtained by additive-color mixing. Subtractive-color mixing can only be obtained when the two, or more, colors are located in the same spot, that is, either one on top of the other as in present film, or mixed together.

Since this process is based on additive-color mixing it is advantageous to have the additive primaries in the image layer and the complementary subtractive primaries in the filter layer. However, this can be reversed, that is having the additive primaries in the filter layer and the subtractive primaries in the image layer. When red light strikes this film it passes through the red dots to give a latent image under them. However, it cannot pass through either the green or blue dots so there will be no latent image under them. On development and coupling the dots under red will be clear and colorless; under green will be magenta and under blue will be yellow. Since both magenta and yellow transmit, or reflect, red light, there will be a preponderance of red in the total transmitted light and the light will appear red, that is the same color as the incident light. However, this red will be mixed with white as in the preceding case. In this case, where each image dot transmits two-thirds of the spectrum the grays will be rather pale, for where no light falls and all colored dots form, two-thirds of the incident light will be transmitted, or reflected. This gives a less satisfactory picture than is obtained in the case where the additive primary colors are obtained in the image layer. However, it is difficult to obtain a good green coupler while cyan, magenta and yellow couplers are well known.

Sidewise diffusion must be considered. If some of the developer under the green and blue dots diffuses laterally into the dot under the red filter some cyan dye will be formed at the edge of the dot. Since cyan will not transmit, or reflect, any red, any cyan formation will cut down the brilliancy of the red and must be avoided.

The developing operation is based on the retention of the developer by the latent image, as explained above. The amount of developer is controlled so that it is substantially all oxidized where the silver emulsion is fully exposed. The excess of unoxidized developer will be inversely proportional to the extent of exposure. The unoxidized developer will diffuse through the panchromatic gelatin film into the coupler-containing image layer.

After the unoxidized developer is diffused into the image layer, it must become oxidized before it can couple properly to form the desired dyes. Generally, air oxidation will be sufficient but an oxidizing agent may be incorporated into the image layer. Usually this will take place after the image layer has been separated from the photosensitive layer.

An additional feature of this invention distinguishes it from those processes embodying selective transference. This is the fact that the entire film (with the exception of the layer containing the developer) is assembled before introduction into the camera and that no further contacting of the film elements need be accomplished after exposure. This fact means that all registry problems are solved in the manufacture of the film. Methods by which these registry problems may be solved in the course of film manufacture are discussed below.

Couplers and developers suitable for the film of this invention are known. Thus, developers which react under the conditions specified above include, but are not limited to, such developers as those containing diethylparaphenylenediamine. The developer chosen should be capable of reacting with all three of the couplers used in the manner described for developer performance.

Examples of couplers which react with this type of developer to form the additive primary colors may include for red dyes, stabilized diazotized metachloroaniline; for green dyes, a mixture of 2,4-dichloro-1-naphthol and an ester of acetoacetic acid; and for blue dyes, 2,4-dichloro-1-naphthol.

Such developer-coupler combinations indicated above are merely illustrative and not meant to be limiting. Many such combinations are possible and will be chosen to attain the best overall combinations.

On removal from the camera the colors appearing on the image-carrying layer may appear pale, but they will brighten and intensify when oxidized by air. Chemical oxidation may be used to accelerate this process but it is not necessary.

In choosing the couplers and the corresponding filter colors, it is necessary that they are spectrally balanced, i.e., that the filter dot filters out essentially the same wavelength range that is reflected by the dye formed in the corresponding coupler-developer reaction. The filter colors may be chosen from any of a large number of dyes known and used, the primary requirement in their choice being the spectral balance described above.

The adhesive used to join the photosensitive element, i.e., layers A and B (FIG. 4), with the receptor element, i.e., layers C and D, must be of the type which achieves good adhesion while the film is being manufactured, handled, and exposed, but must be capable of being released after contact with the developer. It is, of course, necessary that the image-carrying layer (C of FIG. 6) be firmly attached to the supporting sheet (D of FIG. 6) at all times. If it is desired to use the panchromatic layer for making a negative, the contact between panchromatic layer B and filter layer should also be capable of being released. In the example cited below there is a dextrine adhesive on both sides of the panchromatic film. The conversion of panchromatic layer B to a negative will be discussed below.

As indicated in the general description of this invention, the final image may be in the form of a print or a positive transparency, depending upon the type of supporting sheet used. Thus, if the supporting sheet is of an opaque material, the image will be in the form of a print; if the supporting sheet is a transparent material, the image will be in the form of a positive transparency. Opaque materials such as baryta paper, opacified cellulose acetate or opacified cellulose triacetate are suitable as supports to be used for making prints, while transparent materials such as cellulose actate or cellulose triacetate may be used as supports for making transparencies.

The gelatin used in the filter and panchromatic layers may be of any siutable type or grade normally used in color photography processes.

The following example is meant to be illustrative of the film and process of this invention, but it is not to be taken as limiting this invention to the couplers, dyes, filters, developers, and the like used.

Two rolls of thin gelatin film were coated on one side with an adhesive which was easily permeable to water even when dry. Such an adhesive was made mixing 10 parts by weight dextrine with 25 parts by weight glycerine and 100 parts by weight water.

These sheets of adhesive-coated gelatin were assembled with a sheet of gelatin containing a panchromatic photographic emulsion in the middle to form a three-ply assembly, the adhesive serving to firmly cement the assembly when it was pressed by passing through suitable rollers. The assembly was dried to give a three-ply gelatin film with the top and bottom layers being plain gelatin and the middle ply containing a panchromatic photosensitive emulsion.

A reinforcing strip of perforated cellulose acetate was applied to the edges to strengthen the film during handling and the perforations kept the film in register during printing. These reinforcing strips were outside the picture area and were cut off after the backing had been applied.

The half-tone printing operation was a standard typographical process widely used in colored half-tone illustrations. A typical method for preparing a half-tone printing press having six cylinders capable of printing dots in accurate registry on both sides of the film is described below. It will be noted that this description follows the disclosure for such a method published in the Encyclopedia Britannica (14th Edition).

A large chart on flat, smooth board was ruled in straight lines to form uniform squares. The squares were then colored red, green and blue as shown in FIG. 2. The squares can be made in any convenient size and in this case were one-half inch on a side. They were colored by hand. Thus the chart was used in the same manner as a picture would be used for a reproduction master.

The chart was then photographed to reduce the squares to an appropriate size for half-tone dots, for example to 0.01 inch on a side. Three photographic negatives were made, one using a red filter, one using a green filter and one using a blue filter. Thus the negatives prepared registered only the respective red, green and blue squares. The photographs were made under identical conditions so that the size and registry of the dots were the same in all cases.

From each negative two identical prints on sheet copper were made in the usual manner of preparing half-tone plates. In this case the copper plates were coated with gelatin, sensitized with ammonium bichromate and printed under the negatives with a strong light. After printing the plates, they were developed in warm water, dried and heated to harden the dry chromated gelatin. The plates were then etched with ferric chloride, cleaned and used for printing. This was done by maintaining the copper plates on cylinders so that they would print in register. This is the standard color half-tone procedure.

Each of the pairs of identical plates were mounted on two cylinders in register so that they would print identical patterns on both sides of a sheet as illustrated in FIGS. 7–10. The top plate of each pair was inked with the filter color and the lower plate with the coupler compound. Of course, these could be reversed if desired.

The ink must be one that will not interfere with the passage of an aqueous developer through the dots. Such water base inks are well known in the art and are often used in color printing. An ink vehicle of this type was prepared by dissolving 10 parts by weight of dextrine in 100 parts by weight water with slow cooking. In a separate vessel 25 parts by weight powdered gum arabic was dissolved in 25 parts by weight cold water. To make the ink vehicle equal parts of these two solutions were mixed and then 100 parts by weight glycerine was added.

Six different printing inks were required, one for each printing roll. In all six the vehicle was that prepared as described above. Filter dot inks were used on the top set of three rolls and coupler dot inks were used on the bottom set of three rolls. In all cases the coloring material was added to 100 parts by weight of the above ink vehicle. The six coloring materials used were:

Red filter dots:
  4 parts Tartrazin (C.I. 640)
  3.5 parts Rose Bengal (C.I. 779)
Green filter dots:
  6 parts Tartrazin (C.I. 640)
  1 part Patent Blue (C.I. 673)
  2 parts Naphthol Green (C.I. 5)
Blue filter dots:
  3 parts Crystal Violet (C.I. 681)
  1 part Methylene Blue (C.I. 922)

A little acetic acid was used where necessary to achieve good solution. The C.I. numbers are the numbers under which the dyes are listed in the Colour Index.

Cyan coupler dots: 5 parts 2-phenyl-6-chlorophenol
Magenta coupler dots: 5 parts 2-cyanoacetyl-coumarone
Yellow coupler dots: 5 parts α-benzoylacetanilide Since these couplers were insoluble in the vehicle they had to be ground in and treated as pigments.

The rollers were adjusted and inked so that the red filter dots were printed directly over the cyan coupler dots; the green filter dots over magenta coupler dots and blue filter dots over the yellow coupler dots.

The colors in the filter dots act subtractively since they remove, or subtract, part of the light before it reaches the photosensitive layer. Conversely the complementary colors formed in the coupler dots act additively since the light from all the dots in a colored area are added together to give the visual sensation of the resultant color. It is more conventional to consider red, green and blue as additive primaries and cyan, magneta and yellow as subtractive. However, these colors will operate either subtractively or additively if only properly disposed and in this case I have obtained better results by using them in the unconventional way, namely red, green and blue as subtractive and cyan, magenta and yellow as additive.

After printing the film was firmly attached to a backing which in this case was a clear cellulose acetate film since a transparency was to be made. An opaque, white cellulose acetate sheet or white, highly reflecting paper would be used to make a print.

The film thus prepared was exposed in a camera and the developer applied while it remained in the body of the camera. The system of development within a camera body by frangible pods is well known in the art. Therefore it is not a part of the present invention although it was used in carrying out the process of this invention. Since this system of developing has been described in several patents, it need not be described in detail here.

The developer solution used to fill the pods was made up of 0.75 gram diethyl p-phenylenediamine hydrochloride, 14.6 grams sodium carbonate and 130 grams of a 5% water solution of sodium carboxymethyl cellulose.

After exposure and development, but while the film was still wet and the dextrine layer soft, the top layers were separated, as shown in FIG. 6, to give the final transparency, which consists of the backing and coupler layers.

After the photosensitive element has been separated from the receptor element, the photosensitive element may be subjected to further darkroom processing to obtain a black and white negative. The resulting negative will be suitable for producing black and white half-tone prints since the latent image left in the panchromatic layer is in the form of small discrete dots.

One suitable method for processing such a black and white negative is to first roll on or otherwise affix to the now free surface of the panchromatic layer to a thin transparent backing sheet, using a permanent adhesive to make the contact lasting. Once the panchromatic layer is given dimensional stability and strength, the filter layer may be peeled off, preferably in the presence of a hypo solution which must be applied to the panchromatic layer to fix the latent image in that layer. After fixing, washing and drying in the usual manner, there results a black and white negative of the corresponding color print produced by the process of this invention.

A second method is to leave the developed and fixed panchromatic layer in contact with the filter layer, and treat the layers with a bleach to destroy the colors in the filter layer. In the case where the bleach converted the silver to silver halide, it is necessary to redevelop it to change it back to silver.

As pointed out above, all the registry problems of the film of this invention are conveniently solved in the manufacture of the film. Although achieving acceptable registry on both sides of a panchromatic film layer is not too simple or easy, it may be done by several different processes, as illustrated by FIGS. 7 through 10. Basically, the problem is to print filter dots on a water-permeable layer on one surface (hereinafter referred to as the top surface for convenience) of the panchromatic layer and to print the corresponding coupler dots on the other surface (hereinafter called the bottom surface) of the panchromatic layer or on the supporting sheet attached to the bottom surface of the panchromatic layer.

Figure 7:
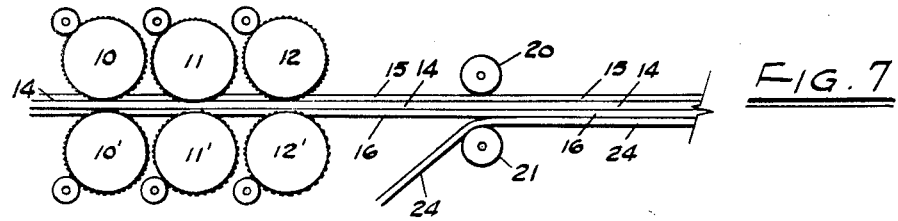
FIGS. 7 through 10 are diagrammatic representations of methods by which the film of this invention may be made.

FIG. 7 illustrates diagrammatically what is probably the simplest approach but the most difficult to accomplish. Thus, a panchromatic layer 14 having thin gelatin layers 15 and 16 on top and bottom, respectively, may be passed between printing rolls 10, 11 and 12, which print filter dots on top layer 15 (filter layer) and corresponding coupler dots on the bottom layer 16 (image-carrying layer) by means of printing rolls 10', 11' and 12'. These printing rolls may be conveniently of the general type now used in making colored half-tone prints since both the process of this invention and that of making half-tone depends upon printing small dots with great accuracy.

A suitable supporting sheet 24 may then be rolled on and attached to the image-carrying layer 16 by means of auxiliary rollers 20 and 21. Although relatively simple, the use of panchromatic film means that the entire process represented by FIG. 7 must be carried out in darkness making adjustments and printing somewhate difficult. There is also, of course, the danger that printing directly on the sensitive panchromatic film may injure the film.

Figure 8:
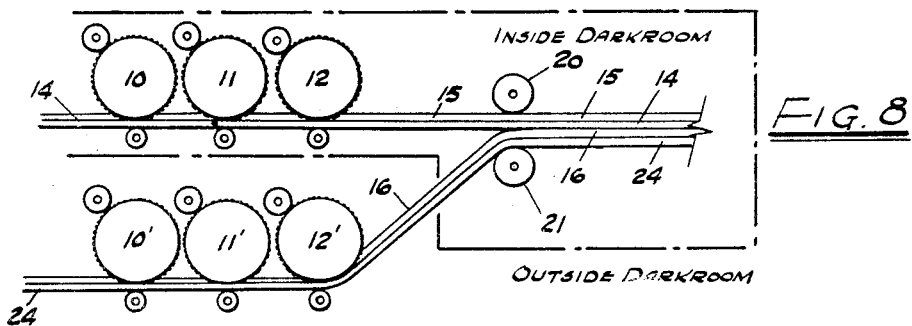
Figure 9:
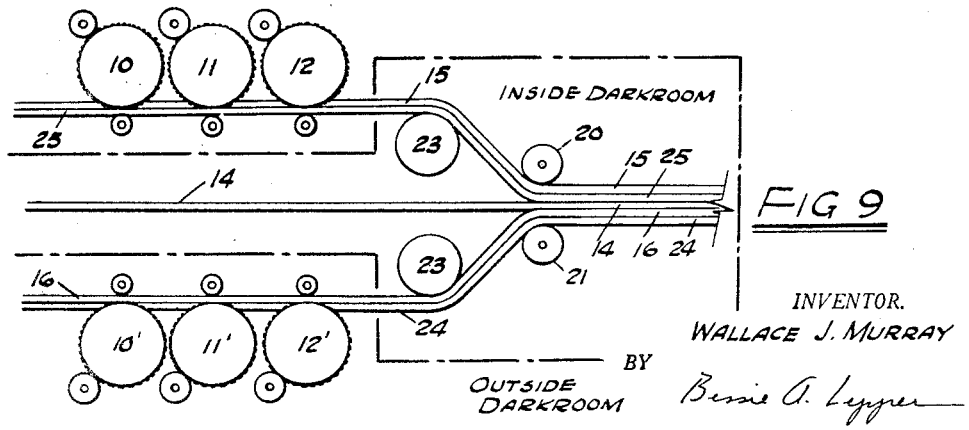

Processes which permit part or all of the printing to be done elsewhere than on the film and outside complete darkness are illustrated in FIGS. 8 and 9 wherein like numbers refer to like components. Thus, in FIG. 8 the filter layer 15, attached to panchromatic layer 14, may be printed in darkness while the image-carrying layer 16 on supporting sheet 24 is printed outside the darkroom. Subsequent joining of these two elements may then be accomplished in the darkroom.

FIG. 9 represents a system which permits printing both the filter layer and image-carrying layer outside the darkroom and subsequently inserting the panchromatic layer between the printed layers within the darkroom. This method, which permits adjustments in printing rolls to be made under lighted conditions, and avoids printing on the sensitive film, requires an additional transparent, permeable layer 25 to be used as a support for filter layer 15 during the printing process and also some additional equipment such as auxiliary rolls 23, etc.

Figure 10:
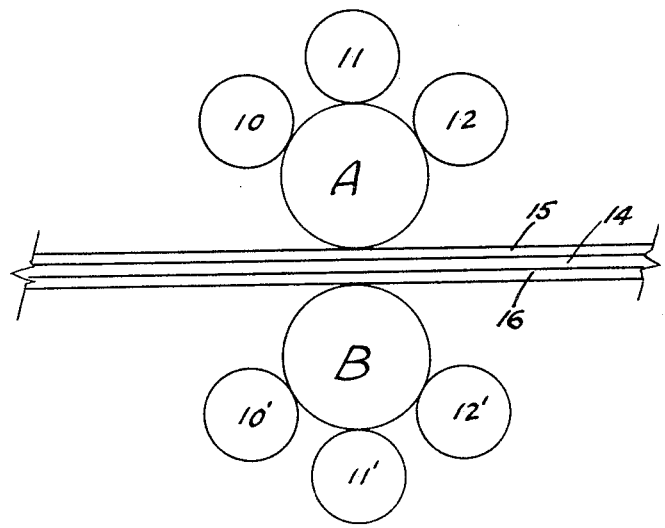

Another method by which the film of this invention may be made is shown in FIG. 10 which is an adaptation of the well-known intaglio method of printing. In this method, the engraved rolls 10, 11 and 12 carrying filter dots press up a printing roll or blanket A and transfer their ink to roll A. Roll A in turn then presses against the surface of gelatin layer 15 and transfers the filter dots to that surface. Similarly, engraved rolls 10', 11', and 12' carrying coupler dots press upon printing roll B which transfers the ink to the surface of gelatin layer 16. One of the printing steps may be accomplished outside the darkroom before the three layers 14, 15 and 16 are assembled.

Any other suitable means may be employed to control printing, rolling, and other operations to achieve acceptable registry in making the film of this invention.

In order to maintain exact registry between the filter and coupler layers, these films may have perforations at their edges, and the various printing rolls, feed rolls and auxiliary rolls may have teeth at their edges. This method of maintaining registry is commonly used in such applications as motion-picture cameras and projectors.

Other methods of printing which are capable of impressing small dots with good accuracy will, of course, also be suitable for use in making the film of this invention.

The film of this invention offers a relatively simple, accurate means for making color prints or positive color transparencies directly without darkroom processing and within a short time after exposure. Because of the simplicity of the process and the ease with which it may be accomplished, this process is particularly well adapted for producing color prints or transparencies directly within the body of the camera. Moreover, many types of cameras can be adapted to use this type of film, the modification being primarily in case structure and possibly in optics. The elimination of the necessity of achieving selective transfer or diffusivity of certain components and the handling of all registry problems at the time of film manufacture means that the film of this invention offers a more accurate and reliable means for producing color prints directly than some of the other methods so far proposed.

This is a continuation-in-part of my application Serial Number 578,393 filed April 16, 1956, now abandoned.

I claim:

1. A photographic film capable of producing images in color, comprising in combination at least four layers, being designated, in order in which light strikes them, the filter layer, the panchromatic layer, the image-carrying layer and the supporting sheet, said filter layer consisting of transparent dots in systematic side-by-side arrangement, each of said dots being one of the three primary colors acting subtractively, said panchromatic layer being silver halide light sensitive granules embedded in a supporting matrix permeable to a developer capable of reducing silver in a latent image to free silver, said image-carrying layer consisting essentially of printed coupler dots and being supported by said supporting sheet, each of said coupler dots when treated with said developer being capable of producing an additive primary color and being located directly below a dot of the corresponding subtractive color filter dot in said filter layer, said supporting sheet being permanently affixed to said image-carrying layer, said image-carrying layer and said panchromatic layer being firmly attached together when dry but being separable in the presence of said developer.

2. A film in accordance with claim 1 wherein said supporting sheet is opaque.

3. A film in accordance with claim 1 wherein said supporting sheet is transparent.

4. A photographic film capable of producing images in color, comprising in combination at least four layers, being designated, in order in which light strikes them, the filter layer, the panchromatic layer, the image-carrying layer and the supporting sheet, said filter layer consisting of transparent dots in systematic side-by-side arrangement, each of said dots being one of the three primary colors acting additively, said panchromatic layer being silver halide light sensitive granules embedded in a supporting matrix permeable to a developer capable of reducing silver in a latent image to free silver, said image-carrying layer consisting essentially of printed coupler dots and being supported by said supporting sheet, each of said coupler dots when treated with said developer being capable of producing a subtractive primary color and being located directly below a dot of the corresponding additive color filter dot in said filter layer, said supporting sheet being permanently affixed to said image-carrying layer, said image-carrying layer and said panchromatic layer being firmly attached together when dry but being separable in the presence of said developer.

5. Method of developing an exposed film comprising in combination a transparent filter layer consisting essentially of transparent dots in systematic side-by-side arrangement, each of said dots being one of the three primary colors acting subtractively, a light-sensitive panchromatic silver halide emulsion layer capable of forming latent images when exposed and reacted with a developer capable of reducing silver in a latent image to free silver, an image-carrying layer containing coupler dots capable of reacting with said developer to form the additive primary colors corresponding to the subtractive filter dots printed directly above them on said filter layer and a supporting sheet for said image-carrying layer, which comprises exposing said silver halide emulsion layer to light through said filter layer, contacting said filter layer with a liquid developer, causing said liquid developer to permeate said filter layer to contact said panchromatic layer and develop latent images formed therein and to react with those of said coupler dots on said supporting sheet which do not lie below said latent images in said panchromatic layer, and separating said panchromatic layer from said image-carrying layer, said liquid developer being capable of developing black and white latent images and of reacting with said couplers to form the additive primary colors.

6. Method of developing exposed film in accordance with claim 5 wherein said liquid developer is contained in frangible pods embedded in a porous matrix and contact with said filter layer is made by bringing together the surfaces of said porous matrix and said filter layer and breaking said frangible pods.

7. Method of developing exposed film in accordance with claim 5 wherein said liquid developer is contained in a porous matrix and contact with said filter layer is made by bringing together the surfaces of said porous matrix and said filter layer and forcing said developer from said porous matrix onto said transparent layer surface.

8. Method of developing exposed film in accordance with claim 5 wherein said liquid developer is introduced between the surfaces of an impermeable sheet and said filter layer, and sufficient pressure is applied to cause the developer to permeate said filter layer.

9. A process for obtaining a color print from a film comprising in combination, in order in which the light strikes said film, a transparent filter layer consisting essentially of transparent dots in systematic side-by-side arrangement, each of said dots being one of the three primary colors acting subtractively, a light-sensitive panchromatic silver halide emulsion layer capable of forming latent images when exposed and reacted with a developer capable of reducing silver in a latent image to free silver, an image-carrying layer of coupler dots capable of reacting with said developer to form the additive primary colors corresponding to the subtractive filter dots directly above them on said filter layer, and an opaque supporting sheet for said image-carrying layer, comprising exposing said film in a camera, causing light to strike said transparent filter layer containing said dots of the three subtractive primary colors cyan, magenta and yellow systematically arranged so that red light penetrates said magenta and yellow dots, green light penetrates said cyan and yellow dots and blue light penetrates said cyan and magenta dots to form latent images in said panchromatic layer, introducing within the body of the camera in which said film is exposed a liquid developer upon the surface of said transparent filter layer, causing said liquid developer to permeate said transparent filter layer to develop said latent images in said panchromatic layer and to react with the couplers of said image-carrying layer lying directly under those areas of said panchromatic layer in which no latent images are created, and removing said film from said camera and separating said panchromatic layer from said image-carrying layer, said liquid developer being capable of developing black and white latent images and also of reacting with the coupler of said coupler dots to form the additive primary colors, red, green and blue.

10. A process for obtaining a true color positive transparency from a film comprising in combination, in order in which the light strikes said film, a transparent filter layer consisting essentially of transparent dots in systematic side-by-side arrangement, each of said dots being one of the three primary colors acting subtractively, a light-sensitive panchromatic silver halide emulsion layer capable of forming latent images when exposed and reacted with a developer capable of reducing silver in a latent image to free silver, an image-carrying layer of coupler dots capable of reacting with said developer to form the additive primary colors corresponding to the subtractive filter dots directly above them on said filter layer and a transparent supporting sheet for said image-carrying layer, comprising exposing said film in a camera, causing light to strike said transparent filter layer containing said dots of the three subtractive primary colors cyan, magenta and yellow systematically arranged so that red light penetrates said magenta and yellow dots, green light penetrates said cyan and yellow dots and blue light penetrates said cyan and magenta dots to form latent images in said panchromatic layer, introducing within the body of the camera in which said film is exposed a liquid developer upon the surface of said transparent filter layer, causing said liquid developer to permeate said transparent filter layer to develop said latent images in said panchromatic layer and to react with the couplers of said image-carrying layer lying directly under those areas of said panchromatic layer in which no latent images are created, and removing said film from said camera and separating said panchromatic layer from said image-carrying layer, said liquid developer being capable of developing black and white latent images and also of reacting with the coupler of said coupler dots to form the additive primary colors, red, green and blue.

11. Process for obtaining a color image and a black and white negative, suitable for making half-tone type prints, from a film comprising in combination, in order in which the light strikes said film, a transparent filter layer consisting essentially of transparent dots in systematic side-by-side arrangement, each of said dots being one of the three primary colors acting subtractively, a light-sensitive panchromatic silver halide emulsion layer capable of forming latent images when exposed and reacted with a developer capable of reducing the silver in a latent image to free silver, an image-carrying layer of coupler dots capable of reacting with said developer to form the additive primary colors corresponding to the subtractive filter dots directly above them on said filter layer, and a supporting sheet for said image-carrying layer, comprising exposing said film in a camera, causing light to strike said transparent filter layer containing said dots of the three subtractive primary colors cyan, magenta and yellow systematically arranged so that red light penetrates said magenta and yellow dots, green light penetrates said cyan and yellow dots and blue light penetrates said cyan and magenta dots to form latent images in said panchromatic layer, introducing a liquid developer upon the surface of said transparent filter layer, causing said liquid developer to permeate said transparent filter layer to develop said latent images in said panchromatic layer and to react with the couplers of said image-carrying layer lying directly under those areas of said panchromatic layer in which no latent images are created, separating said panchromatic layer from said image carrying layer, fixing said latent images in said panchromatic layer, washing and drying the resulting negative, said liquid developer being capable of developing black and white latent images and of reacting with the coupler of said coupler dots to form the additive primary colors, red, green and blue.

12. Process in accordance with claim 11 wherein said panchromatic layer and said transparent layer are separated in the fixing step by means of the hypo solution used in said fixing step.

13. Process in accordance with claim 11 wherein the colors of the dots in said transparent filtering layer are bleached out.

14. Process for making film for producing colored images directly on a supporting sheet comprising the steps of mechanically printing on one surface of a light-sensitive panchromatic silver halide emulsion layer colored transparent dots of cyan, magneta and yellow systematically arranged in side-by-side relationship, mechanically printing on the other surface of said panchromatic layer coupler dots capable of reacting with a silver-halide developer to produce colored dots of red, green and blue, each coupler dot producing red being printed directly under each of said cyan filtering dots, each coupler dot producing green being printed directly under each of said magenta filtering dots, and each coupler dot producing blue being printed directly under each of said yellow filtering dots, and affixing said supporting sheet to said panchromatic layer to that said coupler dots lie between said panchromatic layer and said supporting sheet.

15. Process for making film for producing colored images directly on a supporting sheet comprising the steps of mechanically printing on one surface of a light-sensitive panchromatic silver halide emulsion layer colored transparent dots of red, green and blue systematically arranged in side-by-side relationship, mechanically printing on the other surface of said panchromatic layer coupler dots capable of reacting with a silver halide developer to produce colored dots of cyan, magneta and yellow, each coupler dot producing cyan being printed directly under each of said red filtering dots, each coupler dot producing magenta being printed directly under each of said green filtering dots, and each coupler dot producing yellow being printed directly under each of said blue filtering dots, and affixing said supporting sheet to said panchromatic layer so that said coupler dots lie between said panchromatic layer and said supporting sheet.

16. Process for making film for producing colored images directly on a supporting sheet comprising the steps of mechanically printing on one surface of a light-sensitive panchromatic silver halide emulsion layer colored transparent dots of cyan, magenta and yellow systematically arranged in side-by-side relationship, mechanically printing on one surface of said supporting sheet coupler dots capable of reacting with a silver halide developer to produce colored dots of red, green and blue, and fixing said panchromatic layer on its unprinted side to said supporting sheet so that said coupler dots lie between said panchromatic layer and said supporting sheet, said coupler dots being so arranged that each coupler dot producing red is printed directly under each of said cyan filtering dots, each coupler dot producing green is printed directly under each of said magenta filtering dots, and each coupler dots producing blue is printed directly under each of said yellow filtering dot.

17. Process for making film for producing colored images directly on a supporting sheet comprising the steps of mechanically printing on one surface of a transparent sheet transparent dots of cyan, magenta and yellow systematically arranged in side-by-side relationship, fixing the unprinted side of said transparent sheet to one side of a light-sensitive panchromatic silver halide emulsion layer, mechanically printing on one surface of said supporting sheet coupler dots capable of reacting with a silver halide developer to produce colored dots of red, green and blue, and fixing said supporting sheet to the other side of said panchromatic layer so that each coupler dot producing red is printed directly under each of said cyan filtering dots, each coupler dot producing green is printed directly under each of said magenta filtering dots, and each coupler dot producing blue is printed directly under each of said yellow filtering dots.

18. Process for making film for producing colored images directly on a supporting sheet, consisting of attaching to both surfaces of a light-sensitive silver halide emulsion layer a first and second thin sheet of pure gelatin, mechanically printing on the exposed surface of said first sheet of gelatin colored transparent dots of cyan, magenta and yellow systematically arranged in side-by-side relationship, and mechanically printing on the exposed surface of said second film of gelatin coupler dots capable of reacting with a silver halide developer to produce colored dots of red, green and blue, each coupler dot producing red being printed directly under each of said cyan filtering dots, each coupler dot producing green being printed directly under each of said magenta filtering dots, and each coupler dot producing blue being printed directly under each of said yellow filtering dots.

19. Process in accordance with claim 18 wherein the step of attaching said first and second sheets of pure gelatin to said panchromatic layer is accomplished by the use of an adhesive which releases the bond thus established when said bond is wetted.

References Cited by the Examiner

UNITED STATES PATENTS

| | | | |
|---|---|---|---|
| 976,118 | 11/10 | Brasseur | 96—118 |
| 1,085,727 | 2/14 | Dawson et al. | 96—118 |
| 1,673,300 | 6/28 | Phelps | 96—29 |
| 1,673,349 | 6/28 | DeBercegol | 96—118 |
| 1,918,208 | 7/33 | Larsen | 96—80 X |
| 2,009,424 | 7/35 | Zeller | 96—80 |
| 2,269,158 | 1/42 | Martinez | 96—74 |
| 2,369,476 | 2/45 | Piazza | 96—80 |
| 2,614,926 | 10/52 | Land | 96—80 |
| 2,661,293 | 12/53 | Land | 96—29 |
| 2,707,150 | 4/55 | Land | 96—76 X |
| 2,726,154 | 12/55 | Land | 96—76 |
| 2,968,554 | 1/61 | Land | 96—3 |
| 3,019,124 | 1/62 | Rogers | 96—3 |
| 3,077,399 | 2/63 | Land | 96—3 |

OTHER REFERENCES

Friedman: "History of Color Photography," pages 280, 281, 159 and 160, American Photographic Pub. Co., Boston, 1944.

NORMAN G. TORCHIN, *Primary Examiner.*

MILTON STERMAN, PHILIP E. MANGAN,
*Examiners.*